(12) United States Patent
Bishay et al.

(10) Patent No.: US 6,305,853 B1
(45) Date of Patent: Oct. 23, 2001

(54) CAMERA UTILIZING FILM AND REFLECTIVE IMAGER

(76) Inventors: Magued Bishay, 3223 Colorado Pl., Costa Mesa, CA (US) 92626; Randall M. Chung, 30542 Via Estoril, Laguna Niguel, CA (US) 92677; James K. Dawson, 4664 El Camino Corto, La Canada, CA (US) 91011; David Escobar, 28471 Camino Dimora, San Juan Capistrano, CA (US) 92675; Mike Fukatsu, 13619 Teal Ridge Ct., La Mirada, CA (US) 90638; Edward Andrew Jakl, 14241 Raintree Rd, Tustin, CA (US) 92780; Sarit Neter, 15 Highland View; Ian Olsen, 18600 Jamboree, Apt. 412, both of Irvine, CA (US) 92612; Gregory A. Urban, 16 Grassy Knoll La., Las Flores, CA (US) 92688

( * ) Notice: Subject to any disclaimer, the term of this patent is extended or adjusted under 35 U.S.C. 154(b) by 0 days.

(21) Appl. No.: 09/409,525

(22) Filed: Sep. 30, 1999

(51) Int. Cl.⁷ .................................................. G03B 15/00
(52) U.S. Cl. ............................................ 396/351; 396/429
(58) Field of Search .................................. 396/429, 351, 396/352; 348/64

(56) References Cited

U.S. PATENT DOCUMENTS 6,014,165 * 1/2000 McIntyre et al. ...................... 348/64
6,154,615 * 11/2000 Shimizu et al. .................. 396/429 X

* cited by examiner

Primary Examiner—W. B. Perkey
(74) Attorney, Agent, or Firm—Akin, Gump, Strauss, Hauer & Feld. LLP (57) ABSTRACT

A camera system employs an electronic imager such as a Charged Couple Device (CCD) or a Complementary Metal Oxide Semiconductor (CMOS) array that captures a first portion of light and reflects a second portion of light reflected from a target subject. The light reflected by the electronic imager may be reflected towards film media or a color filter, for example. The electronic imager may include an integrated circuit, or a dielectric reflecting coating that acts to partially reflect incoming light reflected from the target subject. A display, such as an LCD (Liquid Crystal Display), may be utilized to determine which images are desirable or to identify which films to develop. Film writing circuitry that allows various types of information to be written may be utilized. The camera system further features an electronic imager shutter, and a film shutter for shuttering purposes. The film shutter can provide exposure control. The camera system additionally features a processing or control system that selectively controls using the electronic imager or the film media or both simultaneously. The camera system may also have a beamsplitter such as a prism, mirror or optical coating that transmits and reflects light from a subject towards an electronic imager and/or film media, respectively. In addition, the camera system can download digital images to a computer via interface circuitry.

20 Claims, 12 Drawing Sheets

CAMERA UTILIZING FILM AND REFLECTIVE IMAGER

BACKGROUND OF THE INVENTION

1. Technical Field

The present invention relates to the field of camera systems having an optical system for image capture. More specifically, it relates to camera systems that capture images on both film and on electronic imaging arrays.

2. Description of Related Art

Conventional analog camera systems such as a Single Lens Reflex (SLR) or a compact "point and shoot" camera utilize chemical-based film to capture the image of a subject. Such films require further processing to obtain the image of a subject. Processing takes a relatively long time since, typically, a third party developer has to develop the exposed film. Usually, the first opportunity to view captured images is after processing, usually hours after the pictures were taken. The picture quality of such processed film can be unacceptable for any number of reasons, such as overexposure or random camera movement. Because viewing of the developed film occurs long after the images are captured, any opportunity to recapture any substandard images of the subject has then been lost.

Even if there was an opportunity to recapture the images, a second round of picture taking may still produce unacceptable picture quality. This is because most conventional systems do not record lighting or other camera settings and because intrinsic conditions may also have changed. Thus, erroneous settings associated with a first round of picture taking can be repeated.

Further, conventional digital systems may often typically employ electronic imagers such as Charged Couple Devices (CCD's) or CMOS photodetector arrays to capture light reflected from a subject. While these conventional digital systems produce images of relatively low resolution, analog "film based" systems are known to produce quality images of much higher resolution. That is, conventional digital cameras produce less defined pictures that are of relatively poor quality compared to their analog "film based" counterparts.

Two separate systems, that is, a digital camera system and an analog camera system can be employed for image capture. Both cameras, however, cannot be simultaneously operated to capture the same image. The digital camera may first be utilized to capture an image, followed by the analog camera system or vice-versa. Slight changes in conditions or movement of the subject may occur between the initial and any subsequent image captures. Accordingly, because the images are not simultaneously captured, the pictures taken by both the digital and analog camera systems are often not similar.

Further disadvantages of the related art will become apparent to one skilled in the art through comparison of the related art with the present invention as set forth in drawings and the remainder of the specification that follows.

SUMMARY OF THE INVENTION

Various aspects of the present invention can be found in a camera system that captures light reflected from a target subject. The camera system has an optical system that focuses the reflected light along an optical path within the camera system. The camera system further features an electronic imager and analog film media that captures the reflected light.

In some embodiments, the camera system may have an exposure time shutter that provides the analog film media with exposure control. In other embodiments, the camera system has a blocking shutter that regulates the amount of light received by the analog film media.

Further aspects of the present invention may be found in a camera system having a beamsplitter, an electronic imager and analog film media. The beamsplitter apportions the reflected light along two separate optical paths. The electronic imager and the analog media are optically arranged to capture the light reflected along the separate optical paths.

In some embodiments, the camera system has color imaging components to provide the electronic imager with color imaging capabilities. In other embodiments, the camera system has an exposure time shutter that is positioned between the beamsplitter and the analog film media. In other embodiments, a blocking shutter replaces the time exposure shutter.

Aspects of the present invention may also be found in a camera system having an optical system with two lens assemblies. The lens assemblies focus light reflected from a target subject along two separate optical paths. This embodiment similarly features an electronic imager and analog film media that captures light reflected from a target subject.

The camera system of the present invention may feature interface circuitry having a transceiver, serial port, USB and/or PCMCIA capabilities. These capabilities enable download, transfer or storage of digital images. Further, the system may have film writing circuitry, which allows various information relating to image type, film type, film setting, time and date stamp, and exposure information to be written on the analog film media.

Other aspects of the present invention will become apparent with further reference to the drawings and specification which follow.

DETAILED DESCRIPTION OF THE PREFERRED EMBODIMENTS

Figure 1:
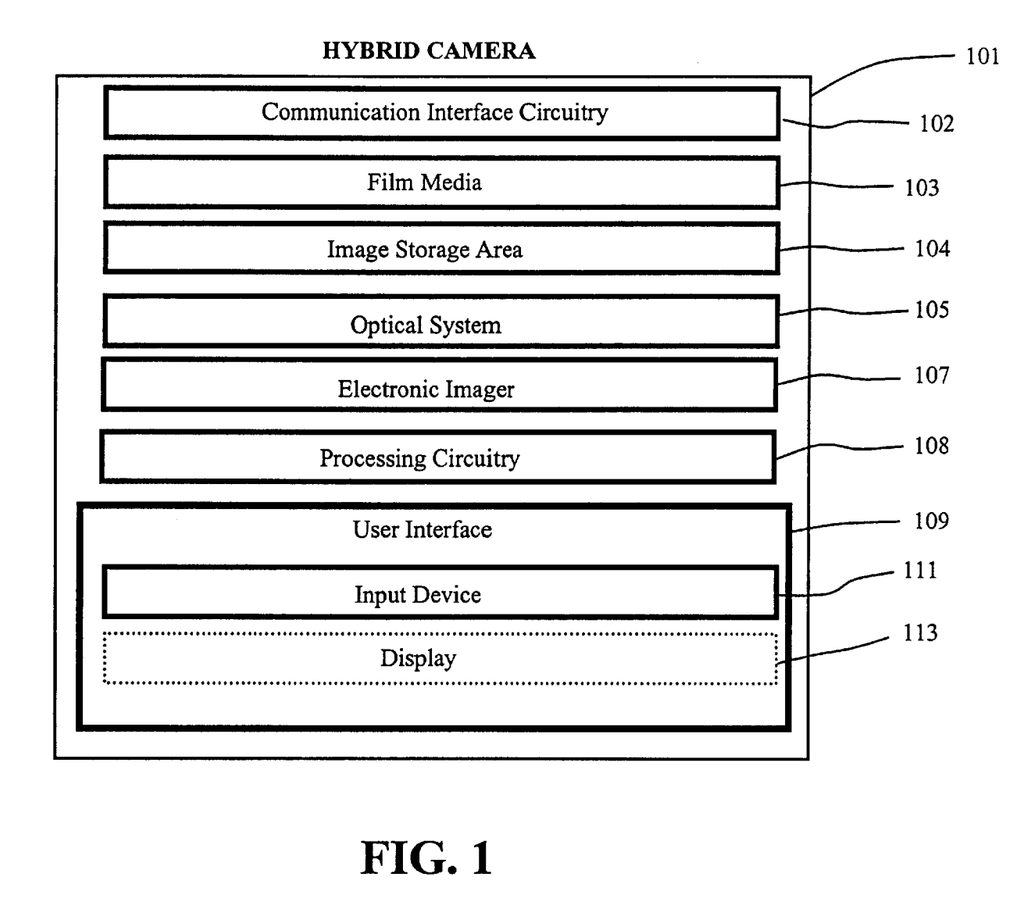
FIG. 1 is a schematic block diagram of a hybrid camera system illustrating various components that achieve the image splitting, reflection and capture functionality according to the present invention.

FIG. 1 is a schematic block diagram of a hybrid camera system illustrating various components that achieve the image splitting, reflection and capture functionality according to the present invention. Specifically, a user seeking to capture images of a target subject using the hybrid camera system 101 initiates image capture via an input device 111 within a user interface 109. The processing circuitry 108 responds by directing the optical system 105 to pass light reflected from the target subject into the camera system. The optical system 105 focuses the reflected light along an optical path towards a film media 103 and an electronic imager 107. Both the film media 103 and electronic imager 107 are optically positioned to capture at least a portion of the reflected light that is reflected from the target subject. The film media 103 captures chemical based film images for later processing while the electronic imager 107 captures digital images of the target subject for storage in an image storage area 104, and subsequent printing or transfer via communication interface circuitry 102.

Optionally, a display 113 is available for viewing the digital images prior to or after the images are captured and stored. The display 113 may comprise an LCD (Liquid Crystal Display), LED's (Light Emitting Diodes) and/or an LED display. Also, the input device 111 within the user interface 109 may comprise various manual input or voice input devices, e.g., a touch pad, keypad, independent buttons, voice recognition software or microphones. In the present embodiment, the optical system 105, the electronic imager 107 and the film media 103 may either share a common optical path or have separate optical paths.

Figure 2:
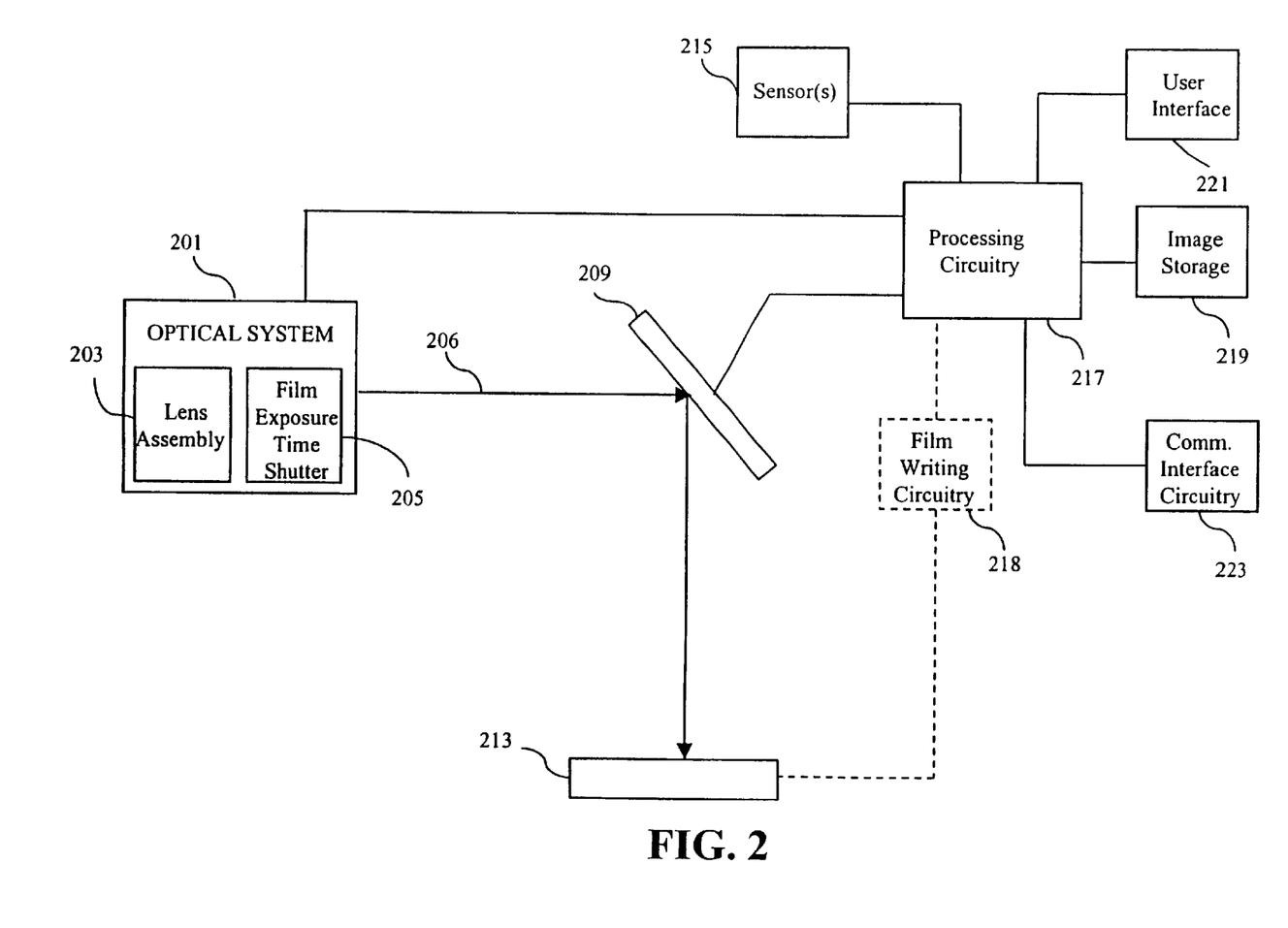
FIG. 2 is an exemplary embodiment of the hybrid camera system of FIG. 1 illustrating electronic image reflection and capture functionality according to the present invention.

FIG. 2 is an exemplary embodiment of the hybrid camera system of FIG. 1 illustrating electronic image reflection and capture functionality according to the present invention. Specifically, the hybrid camera system captures both digital and analog images of a target subject utilizing an optical system 201, an electronic imager 209 and film media 213.

The optical system 201 via a lens assembly 203 focuses light reflected from the target subject towards the electronic imager 209. The electronic imager 209 is optically positioned along an optical path 206 to capture the reflected light. In addition to capturing an electronic image, the electronic imager 209 further reflects light towards the film media 213, for example. The film media 213 is also positioned along the optical path 206 to render a film image of the target subject. The electronic imager 209 may reflect the light reflected from the target subject for other purposes. For example, the electronic imager 209 may reflect the light towards a color filter.

The electronic imager 209 typically utilizes a photo detector array. The array may comprise, for example, a solid state image sensor such as a Charged Couple Device (CCD) or a Complementary Metal Oxide Semiconductor (CMOS) array. The photodiode array of the electronic imager detects light reflected from the subject, and outputs a digital signal corresponding to the amount of light received as pixels. Although the electronic imager 209 is illustrated as arranged at a 45° angle, the angle may be greater or lesser with the film media 213 correspondingly adjusted.

The processing circuitry 217 provides exposure control using read-out timing wherein each pixel or row of the photo detector array is read out after a predefined time elapses. Alternatively, the processing circuitry 217 can directly switch off the charging or discharging of the photo detectors through use of additional circuitry to control exposure time.

After capturing the subject image, the processing circuitry 217 forwards the images to image storage circuitry 219. Viewing and subsequent distribution can occur through a display device within a user interface 221 and via communication interface circuitry 223, respectively.

The film media 213 can be a chemical based film. This film captures the light as reflected from the electronic imager 209, and forms a film image of the subject. The film media 213 typically requires accurate exposure control to maintain desired image quality. In the present embodiment, an exposure time shutter 205 often found in conventional cameras accomplishes this objective. The processing circuitry 217 uses an infrared sensor 215 to automatically determine exposure timing for controlling the exposure time shutter 205. Alternatively, the exposure time shutter 205 may be manually activated to achieve the same objective.

The processing circuitry 217 is coupled to communication interface circuitry 223 that may be a serial port, USB transceiver or a PCMCIA port. Digital images are transferable to a personal computer via a serial port within the communication interface circuitry 223, for instance. The processing circuitry 217 is further coupled to the image storage circuitry 219. The digital images can be stored via the image storage circuitry 219 comprising a floppy disk, hard drive, and/or memory, for example.

The camera system may include film writing circuitry 218. The film writing circuitry 218 allows various information relating to image, film type, film setting, time and date stamp, and exposure information to be written on film media 213. In one embodiment, a transparent magnetic coating similar to that utilized in the Advanced Photo System (APS)™ enables this information to be written. In another embodiment, the digital image can be stored on negatives along with the film exposure information. Both the digital image and information can subsequently be encoded on picture paper after the film is developed. To decode this information, a "swipe reader" can be used, for example.

A user may selectively capture only film images or both film and digital images. To capture film images only, the processing circuitry 217 directs the exposure time shutter 205 to expose the film media 213 without reading out the photodiode array of the electronic imager 209. If both digital and film images are desired, the processing circuitry simply reads out the photodiode array of electronic imager 209 in addition to exposing the film media 213.

A user may further choose to view a target subject on the optional display device within the user interface 221 prior to capturing an image. If the image is undesirable, the user can simply refrain from capturing the image. Moreover, the user may choose to capture images and also choose to annotate the images. Thus, the user can identify the characteristics of acceptable photographs to thereby enhance picture development.

Figure 3:
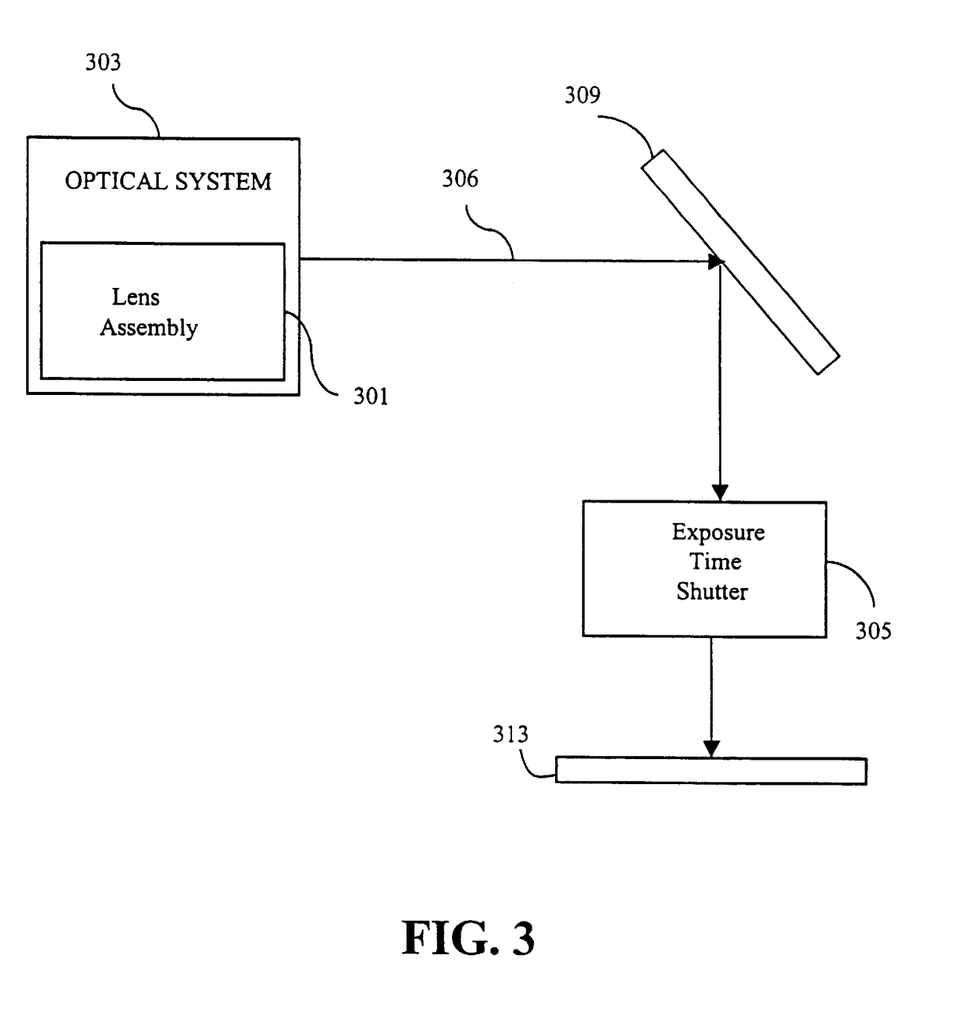
FIG. 3 is an alternate embodiment of the camera system of FIG. 1 wherein image reflection and capture functionality according to the present invention is achieved via placement of an exposure time shutter.

FIG. 3 is an alternate embodiment of the camera system of FIG. 1 wherein image reflection and capture functionality according to the present invention is achieved via alternate placement of an exposure time shutter. Specifically, an exposure time shutter 305 is positioned along an optical path 306 between an electronic imager 309 and film media 313.

An optical system 303 utilizes a lens assembly 301 to direct light reflected from a subject towards the electronic imager 309. The electronic imager 309 captures and further reflects the light via the exposure time shutter 305, towards the film media 313. Thereafter, the film media 313 captures the reflected light to form a film image of the target subject.

The optical system 303 comprises the lens assembly 301 and includes no exposure control mechanism. Thus, the electronic imager 309 provides its own exposure control via a processing circuitry operating as previously depicted in FIG. 2 and described above. Exposure control of the film media 313 is provided by the exposure time shutter 305 via the processing circuitry.

Similarly, the electronic imager 309 and the film media 313 are coupled to the processing circuitry function via the film writing circuitry.

Figure 4:
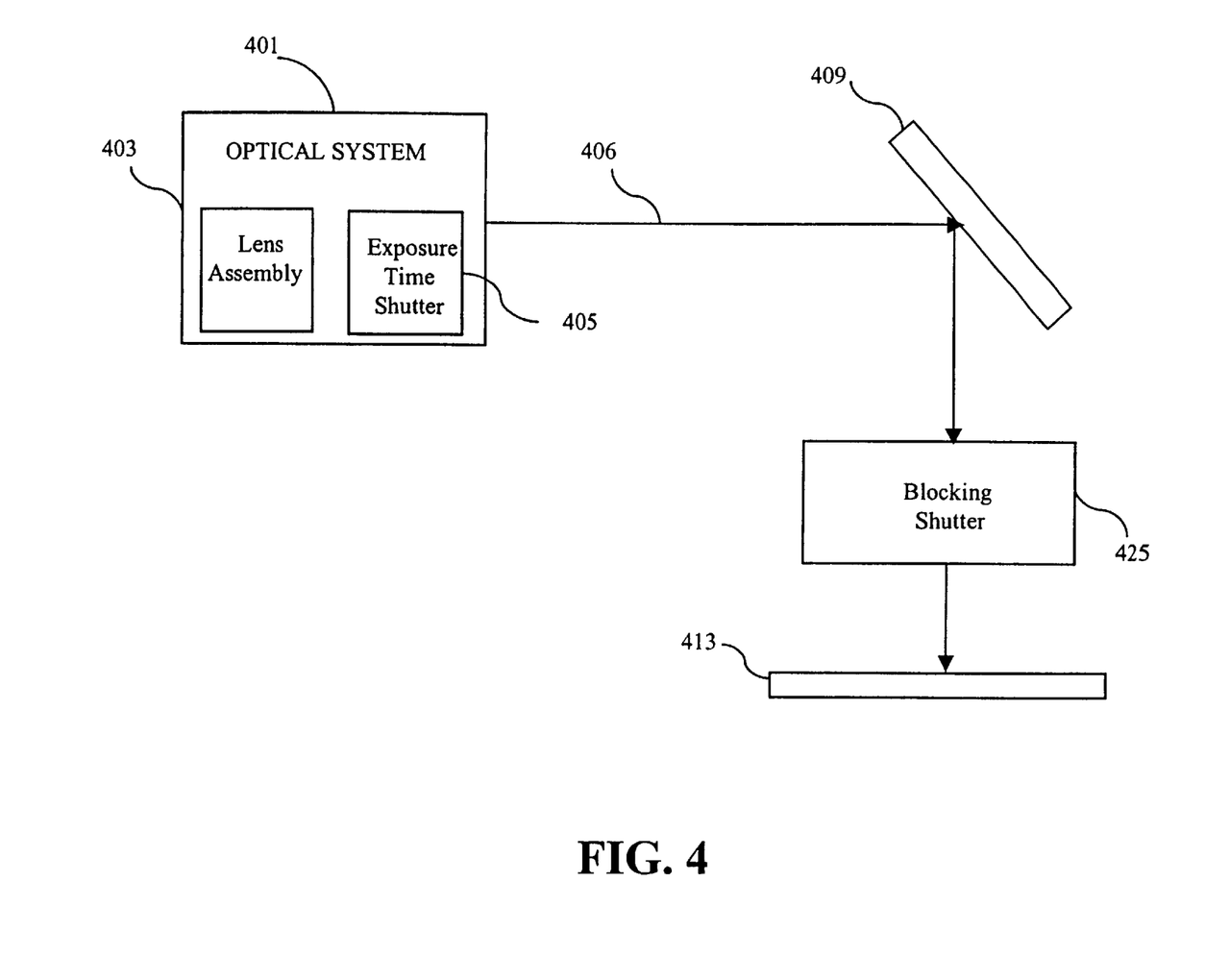
FIG. 4 is an exemplary embodiment of the camera system of FIG. 1 illustrating the image reflection and capture functionality through use of a blocking shutter.

FIG. 4 is an exemplary embodiment of the camera system of FIG. 1 illustrating the image reflection and capture functionality through the use of a blocking shutter. Specifically, an optical system 401 employs an exposure time shutter 405 and a blocking shutter 425 to render the requisite exposure control to an electronic imager 409 and film media 413, respectively.

Because the blocking shutter 425 is located between the electronic imager 409 and the film media 413, a user can choose to capture either digital or film images, or both. To capture digital images only, the processing circuitry deactivates the blocking shutter 425. The blocking shutter prevents light from reaching the film media 413 while the electronic imager photodiodes are read out. To obtain analog images only, the processing circuitry opens the blocking shutter 425 to expose the film media 413 without reading out the photodiode array of the electronic imager 409. The electronic imager 409 is read out and the blocking shutter 425 activates in order to expose the film media 413 to capture both digital and analog images.

As an alternative to the direct circuit exposure control referenced in FIG. 2, the exposure control of the electronic imager 409 is accomplished via the exposure time shutter 405. The exposure time shutter 405 is directed by the processing circuitry to regulate the amount of light received by the electronic imager 409.

Exposure control of the film media 413 is provided by the blocking shutter 425, which regulates the quantity of light reaching the film media 413. The blocking shutter 425 closes to prevent light from reaching the film media 413 when optimal exposure has been attained. The blocking shutter 425 is typically a mechanical device but other comparable means may be employed.

Figure 5A:
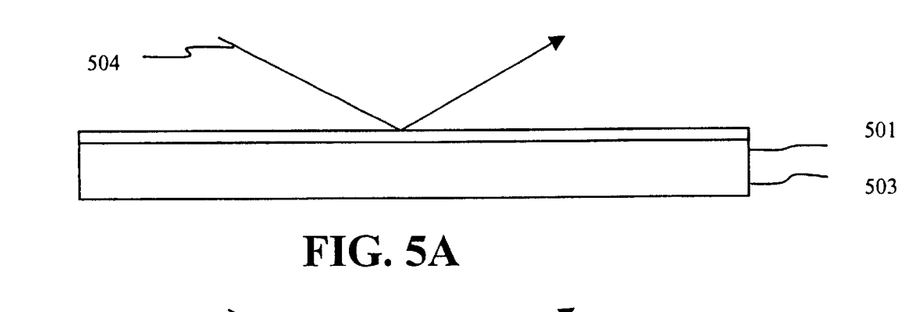
FIG. 5A is an exemplary embodiment of an electronic imager according to the present invention.

The optical system 401, the electronic imager 409 and the film media 413 (via the film writing circuitry) are coupled to the processing circuitry 217, described above, and operate as previously described in the block diagrams referenced in FIG. 2a FIG. 5A is a cross sectional view of an embodiment of an electronic imager built in accordance with the present invention. The electronic imager comprises an integrated circuit that acts to partially reflect incoming light reflected from a target subject along an optical path 504. The integrated circuit includes a substrate 503 and a metallization layer 501. The substrate 503 is typically silicon or germanium while the metallization layer 501 is typically aluminum, which is utilized to form the conducting circuitry. The metallization layer 501 and the underlying substrate 503 act to partially reflect the incoming light toward the film media.

Figure 5B:
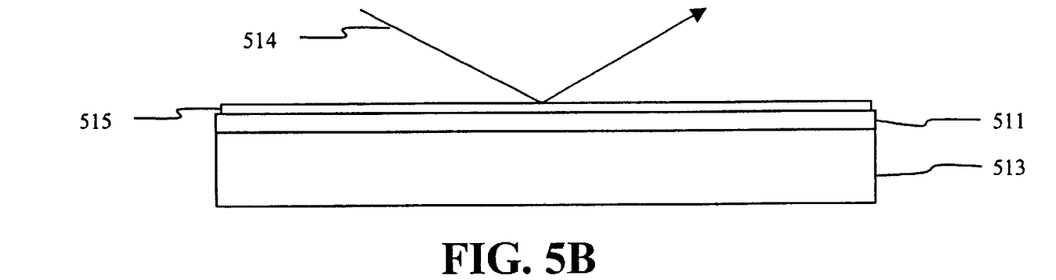
FIG. 5B is another exemplary embodiment of an electronic imager according to the present invention.

FIG. 5B is an alternate exemplary embodiment of an electronic imager according to the present invention. Specifically, a dielectric reflecting coating 515 is layered on an integrated circuit having a metalization layer 511 and a substrate 513. The dielectric reflective coating 515 functions to enhance the quality of light reflected by the electronic imager along an optical path 514.

The dielectric reflecting coating 515 transmits a first portion and further reflects a second portion of light reflected from a target subject. The first portion of light is transmitted to reach a photodiode array within the integrated circuit, which produces the corresponding electrical signals for image capture. The second portion of light is reflected towards a film media as referenced in the preceding embodiments.

Alternatively, several coatings of the dielectric reflecting coating 515 may be alternately layered to increase the reflectivity of the coatings. One layer has a high refractive index and a thickness $\lambda/4$, where $\lambda$ denotes the refractive index of the layer. The other layer has a low refractive index and a thickness $\lambda/4$. Light reflected at each layer constructively interferes to increase the reflectivity of the electronic imager.

Figure 5C:
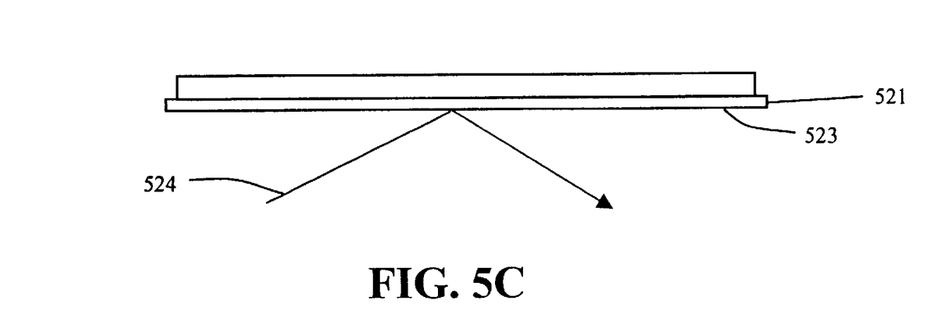
FIG. 5C is another exemplary embodiment of an electronic imager according to the present invention.

FIG. 5C is another exemplary embodiment of an electronic imager according to the present invention. Specifically, FIG. 5C illustrates the cross sectional view of an integrated circuit imager having a metallization layer 521 and a substrate 523 with a relatively narrow thickness. The integrated circuit imager admits light along an optical path 524 from the die side of the integrated circuit as opposed to the metalization side referenced in FIGS. 5A and 5B. The substrate 523 acts to partially transmit a first portion and further reflect a second portion of light reflected from a target subject.

The substrate 523 possesses a natural luster that reflects the second portion of light from the target subject. The die thickness, however, must be relatively narrow to enable the first portion of light transmitted through the substrate 523 to reach the photodiode array disposed on the other side. The first and second portions of light that are respectively transmitted and reflected are utilized by the electronic imager and film media as referenced in prior embodiments.

Figure 6:
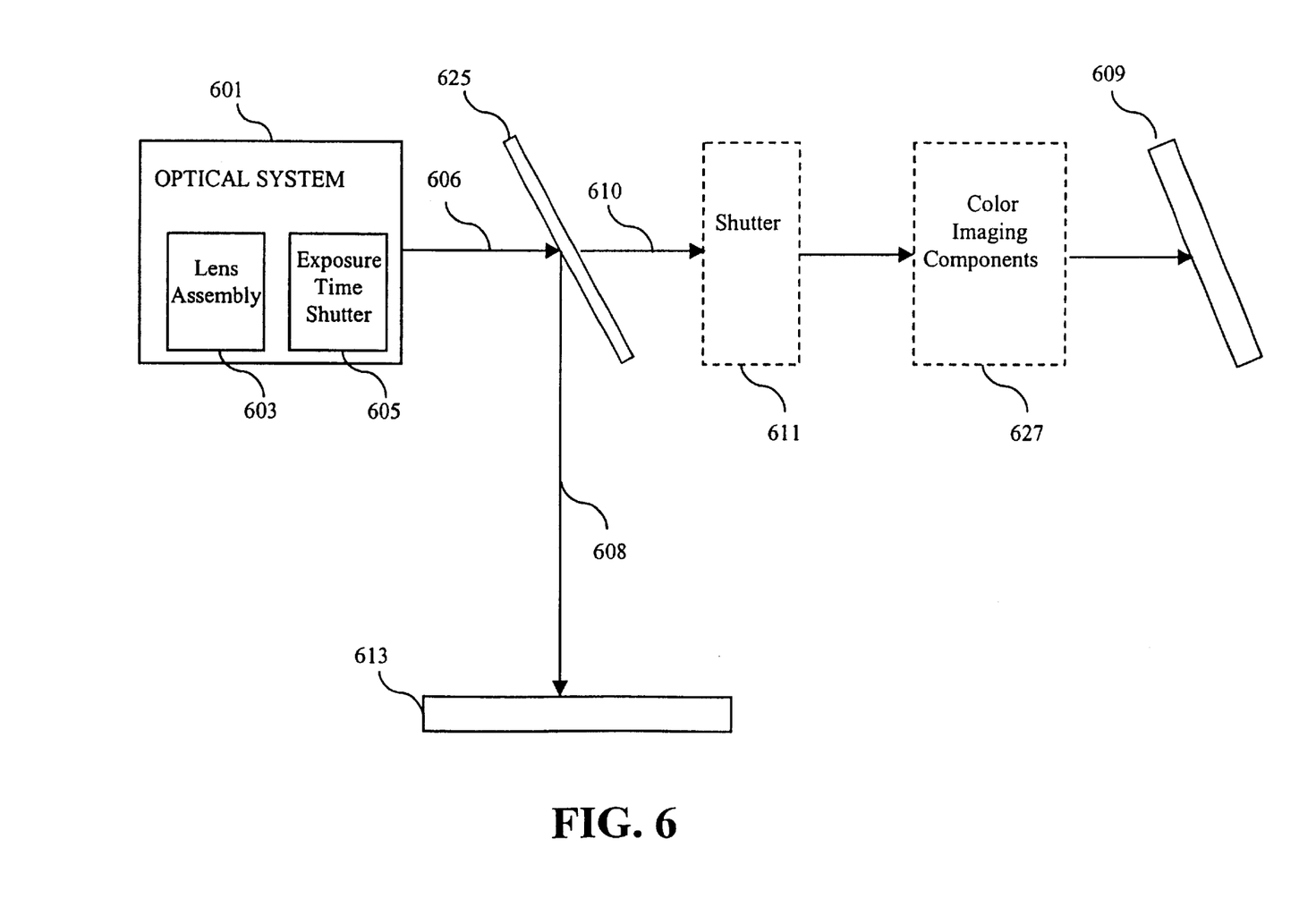
FIG. 6 is an exemplary embodiment of the camera system of FIG. 1 that achieves color imaging reflection and capture functionality through beam splitting according to the present invention.

FIG. 6 is an exemplary embodiment of the camera system of FIG. 1 that achieves color imaging reflection and capture functionality through beamsplitting according to the present invention. Specifically, a beamsplitter 625 is optically positioned along an optical path 606 to achieve this functionality in the present invention.

An optical system 601 is a single shutter embodiment. The optical system 601 includes a lens assembly 603 that directs light reflected off the subject towards the beamsplitter 625. The beamsplitter 625 can be made of optically selected glass with a partially transmitting and partially reflecting film on the surface. Thus, the beamsplitter 625 simultaneously transmits and reflects the subject image in separate directions. While one direction is along an optical path 610, the other is along a separate optical path 608. The transmission/reflection ratio of the beamsplitter 625 is selected to correspond to the exposure requirements of an electronic imager 609 and film media 613. Some of the industry standard reflection/transmission ratios may include: 20/80, 30/70, 40/60 and 50/50. Alternatively, the beamsplitter 625 may comprise an optical prism having a reflective coating on its surfaces.

Optionally, the beamsplitter 625 can be attached so that only analog images, digital images or both types of images are captured. The beamsplitter 625 is shown at a 45° angle which can be increased or decreased depending on the image desired. To capture digital images only, the beamsplitter 625 is horizontally adjusted, that is, parallel to the optical path 606, so that the beamsplitter is removed from the optical path 610. Thus, there is no light reflection towards the analog film media 213.

To capture analog images only, the beamsplitter 625 is vertically adjusted to an angle between 45 and 90 degrees. This angle allows both transmission and reflection of the subject image. However, an optional shutter 611 along the optical path 610 remains closed and prevents light from reaching the electronic imager 609. Consequently, only analog images are produced.

To obtain both analog and digital images, the beamsplitter 625 is again adjusted to an angle between 45 and 90 degrees, while the optional shutter 611 remains open. Hence the subject image is reflected towards the film media 613 and further transmitted towards the electronic imager 609.

Figure 9:
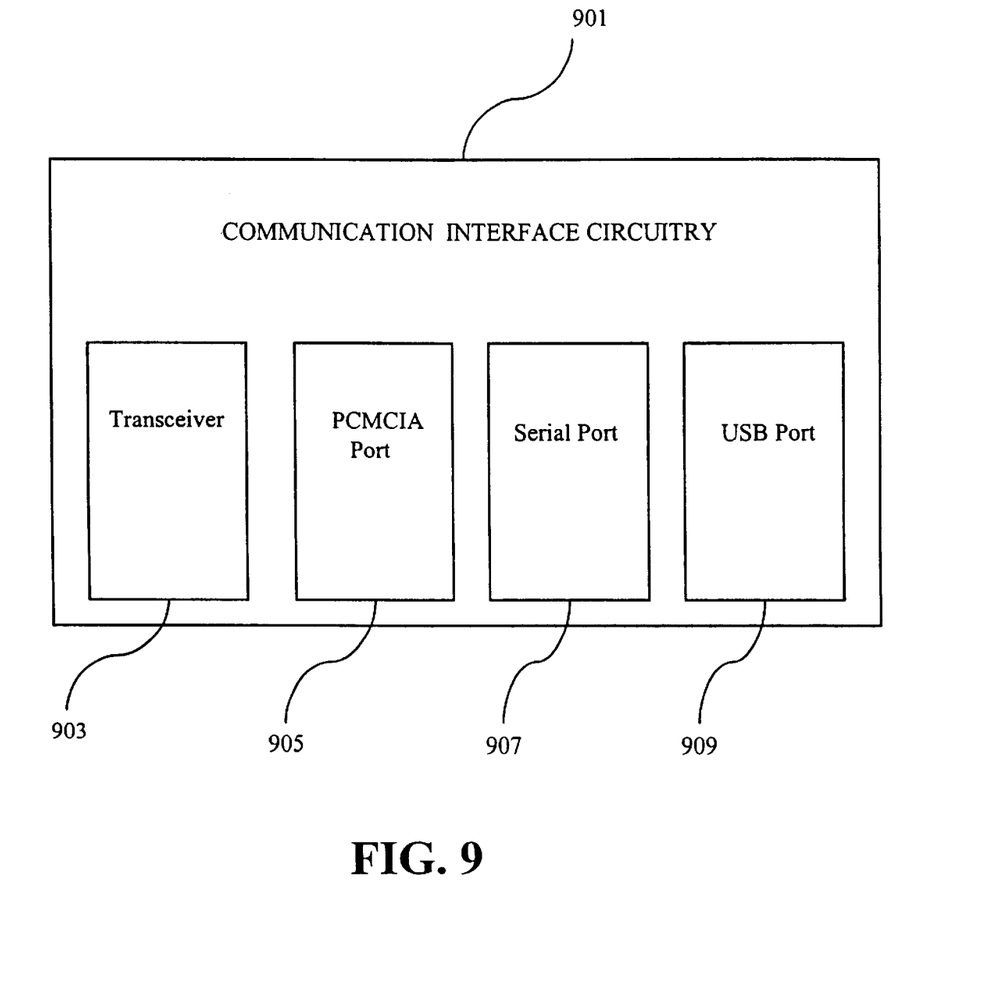
FIG. 9 is a schematic block diagram of the interface circuitry of the camera system of FIG. 1 illustrating digital imagery output functionality according to the present invention.
Figure 10:
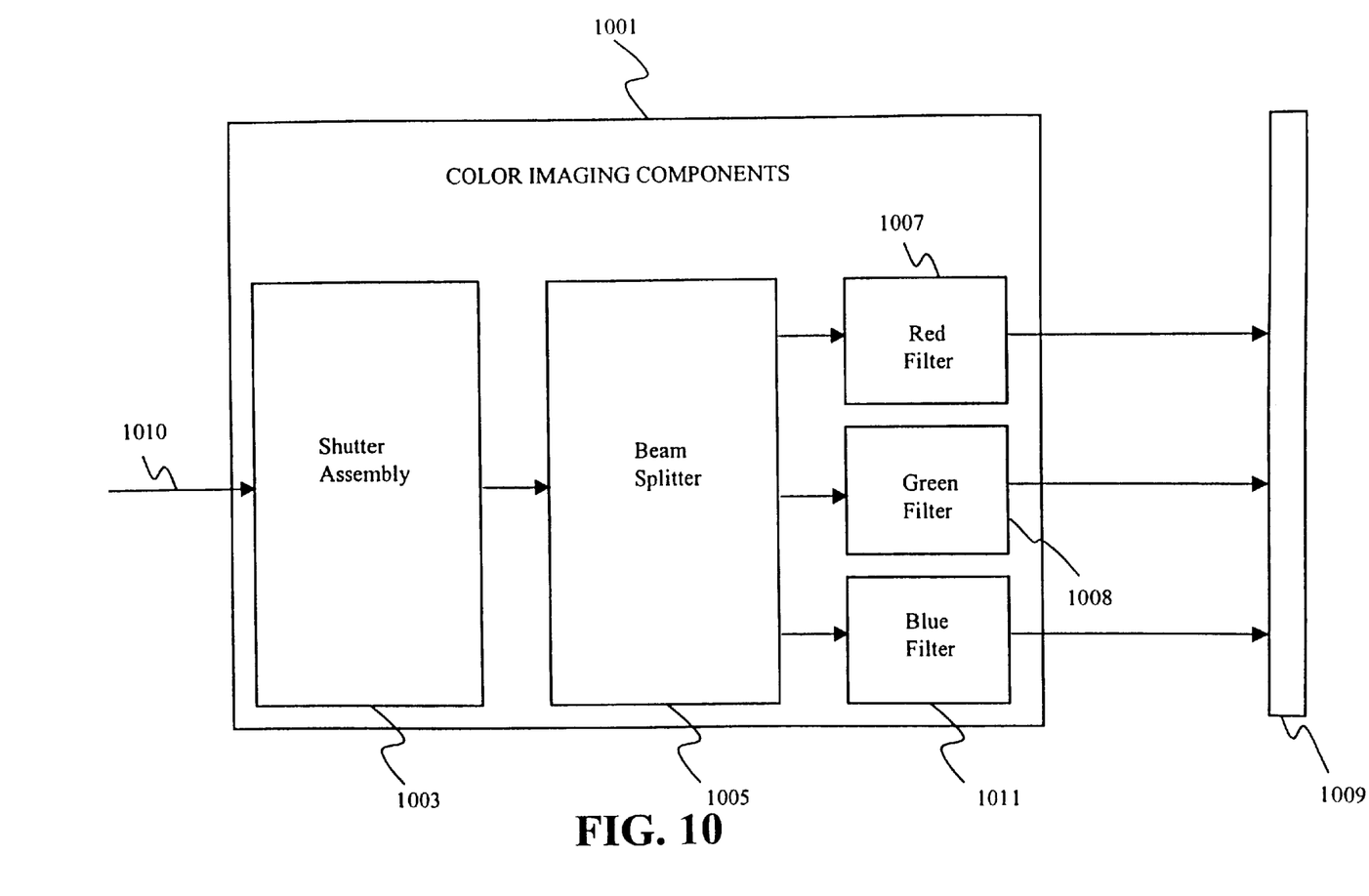
FIG. 10 is a schematic illustration of the color imaging components that renders color image functionality according to the present invention.

The camera system may also include color imaging components 627 as shown in FIGS. 9 and 10. However, to the extent that no color imaging component is utilized, all images will be black and white. The optical system 601, the electronic imager 609 and the analog film media 613 are coupled to the processing circuitry via the film writing circuitry and function as discussed in reference to the corresponding blocks in FIG. 2.

Figure 7:
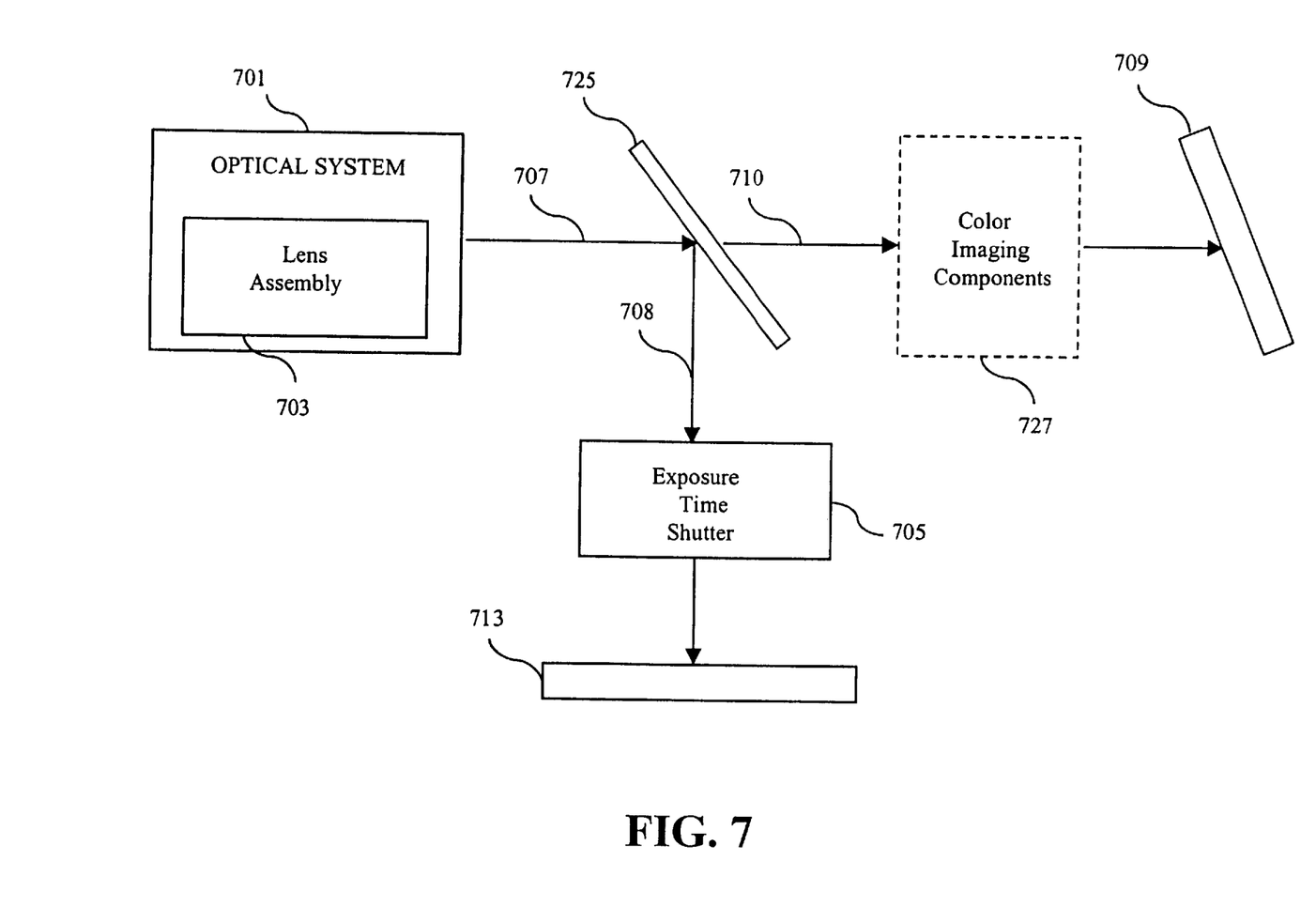
FIG. 7 is another exemplary embodiment of FIG. 1 that accomplishes the image reflection and capture objective via a beamsplitter and an exposure time shutter.

FIG. 7 is a further exemplary embodiment of FIG. 1 that accomplishes the image reflection and capture objective via a beamsplitter and an exposure time shutter. That is, an exposure time shutter is no longer incorporated within the optical system. Rather, an exposure time shutter 705 is positioned between a beamsplitter 725 and film media 713.

The exposure time shutter 705 functions as discussed in reference to FIG. 3. The electronic imager 709 and the analog film media 713 are coupled to the processing circuitry in conjunction with an optical system 701 via the film writing circuitry and function as discussed in reference to the corresponding blocks in FIG. 2. The exposure time shutter 705, however, is directly coupled to processing circuitry 217, as referenced in FIG. 2.

Figure 8:
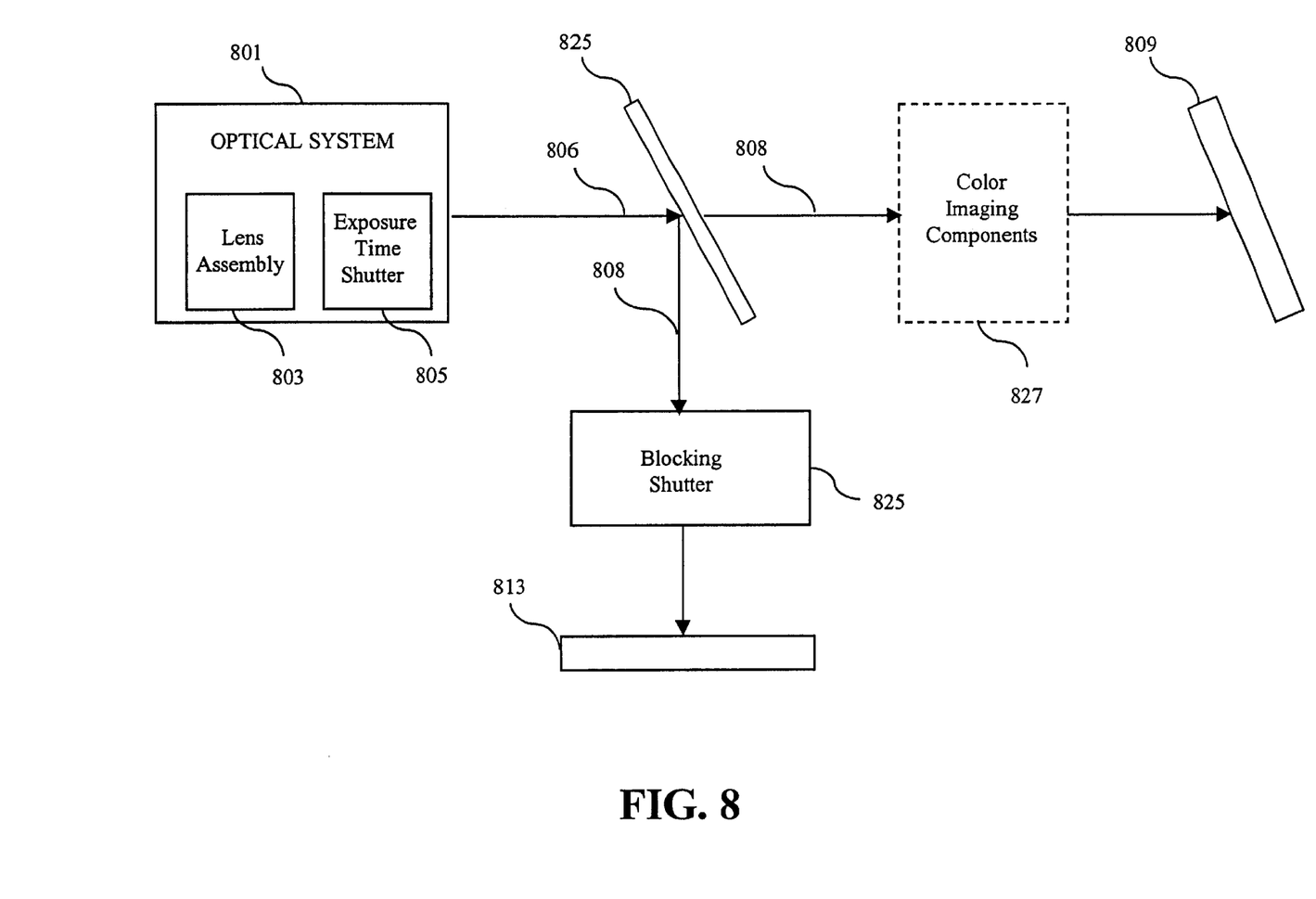
FIG. 8 is another exemplary embodiment of FIG. 1 that achieves image reflection and capture functionality via beam splitting and through use of a blocking shutter according to the present invention.

FIG. 8 is another exemplary embodiment of FIG. 1 that achieves image reflection and capture functionality via beamsplitting and through use of a blocking shutter according to the present invention. In particular, a blocking shutter 825 replaces the exposure time shutter 605 (referenced in FIG. 6). The blocking shutter 825 is positioned between a beamsplitter 825 and film media 813 along an optical path 808.

An optical system 801 including a lens assembly 803 and an exposure time shutter 805 function as in previous embodiments. An electronic imager 809 and the blocking shutter 825 function as referenced above in FIG. 4.

FIG. 9 is a schematic block diagram of the interface circuitry of the camera system of FIG. 1 illustrating digital imagery distribution and transfer functionality according to the present invention. More specifically, digital images of a subject can be downloaded or printed via a serial port 907 to a computer, for example. In addition, the same objective can be achieved via a PCMCIA port 905 or an USB port 909. A transceiver 903 may be removable and wireless. Further, the transceiver may be coupled to the PCMCIA port 905, the serial port 907, and/or the USB port 909.

FIG. 10 is a schematic illustration of color imaging components that render color image functionality according to the present invention. More specifically, a color imaging component 1001 reproduces the color of a target subject based on varying intensities of red, green and blue ("RGB") light.

The color imaging component 1001 receives light reflected from the subject through an optical unit along an optical path 1010. While a shutter assembly 1003 regulates the reflected light, a beamsplitter 1005 apportions the light into three equal portions. The beamsplitter 1005 further directs each portion towards a red filter 1007, a green filter 1008, and a blue filter 1011. In turn, the color filters reproduce color images from the reflected light.

Figure 11:
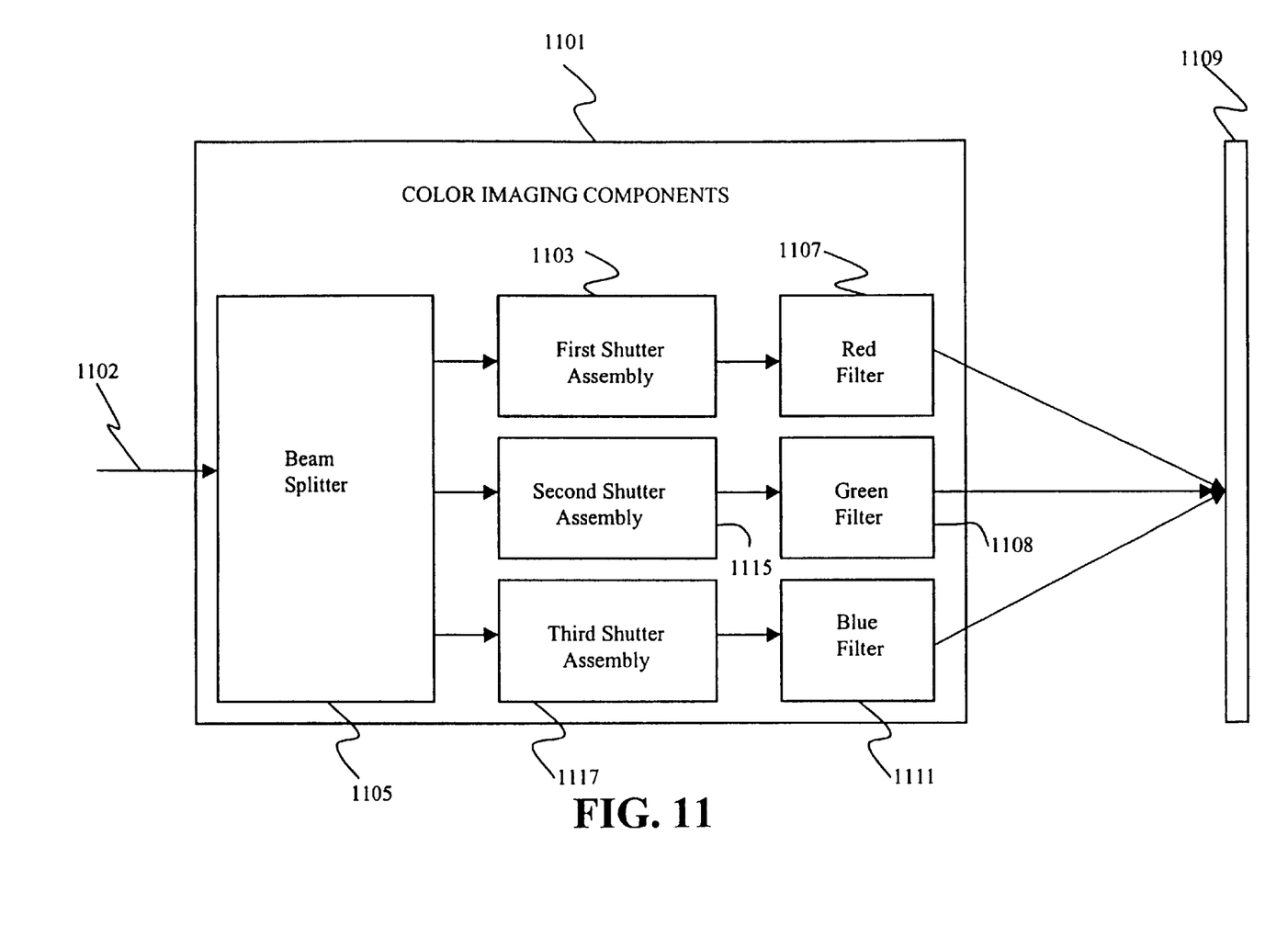
FIG. 11 is a schematic illustration of the color imaging components of FIG. 10 that attain color imaging functionality according to the present invention.

FIG. 11 is an alternate schematic illustration of the color imaging components of FIG. 10 that also renders the color imaging functionality according to the present invention. Particularly, a color imaging component 1101 reproduces the color of the target subject based on the intensity of the reflected light.

The color imaging component 1101 receives light reflected from the subject through the optical unit along an optical path 1102. While a beamsplitter 1105 apportions the reflected light into three separate and equal portions, a first shutter assembly 1103, a second shutter assembly 1115 and a third shutter assembly 1117 regulate the divided portions. The portions are directed towards a red filter 1107, a green filter 1108 and a blue filter 1111, respectively. Consequently, the filters reproduce the colors of a target subject by combining three sequential images having varying intensities of RGB light.

Figure 12:
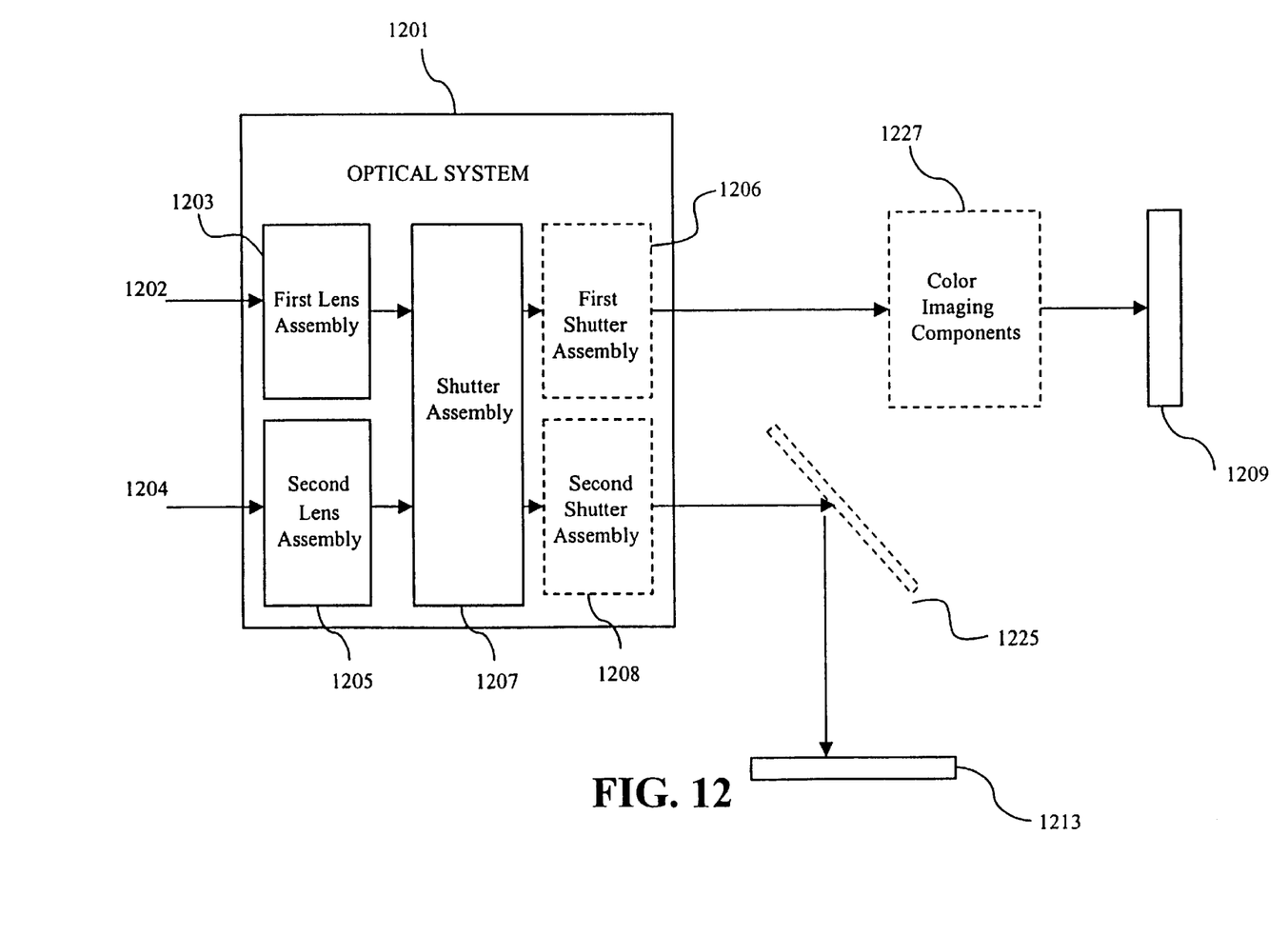
FIG. 12 is an exemplary embodiment of the camera system of FIG. 1 illustrating image reflection and capture functionality through use of fixed focus double lenses according to the present invention.

FIG. 12 is an exemplary embodiment of the camera system of FIG. 1 illustrating image reflection and capture functionality through the use of fixed focus double lenses according to the present invention. More specifically, this embodiment utilizes at least two fixed focus lens assemblies to achieve the said functionality An optical system 1201 receives reflected light from the subject via a first optical path 1202 and a second optical path 1204. Via a first lens assembly 1203, a second lens assembly 1205, and a shutter assembly 1207 further directs the reflected light along separate paths towards an electronic imager 1209 and film media 1213. The focal lengths of the lens assemblies 1203 and 1205 may be the same or different.

A mirror 1225 is positioned along the second optical path 1204 to reflect the subject image towards the film media 1213. The film media subsequently captures the reflected light as referenced in previous embodiments.

An electronic imager 1209 captures the reflected light along the first optical path 1202, as shown. Optional color imaging components 1227, referenced in FIGS. 9 and 10, can be included in order to render color images.

A shutter assemblies 1206 and a second shutter assembly 1208 are optional and are in lieu of the shutter assembly 1207. Shutter assemblies 1206 and 1208 function to provide either digital images, analog images, or both. That is, the second shutter assembly 1208 remains closed, while the first shutter assembly 1206 permits light to pass through, so that the camera system provides only digital images. Likewise, when the shutter assembly 1206 remains closed, while the second shutter assembly 1208 permits light to pass through, only analog images are provided. When both shutters permit light to pass through digital and analog images are provided.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A camera system that utilizes film media, the camera system receiving light reflected from a subject along an optical pathway, the camera system comprising:

an optical system disposed along the optical pathway;

an electronic imager disposed along the optical pathway, the electronic imager utilizing a first portion of the light reflected from the subject to capture an electronic image; and the electronic imager directing a second portion of the light reflected from the target subject towards the film media.

2. The camera system of claim 1 further comprising an electronic imager shutter.

3. The camera system of claim 1 further comprising a film shutter.

4. The camera system of claim 2 wherein the electronic imager shutter is used to provide exposure control.

5. The camera system of claim 3 wherein the film shutter is used to provide exposure control.

6. The camera system of claim 1 further comprising a control system that selectively permits the capture of images using the electronic imager or the film media or both simultaneously.

7. The camera system of claim 1 further comprising a screen that is utilized to display electronic images captured by the electronic imager.

8. A camera system that utilizes film media and directs light reflected from a target subject along an optical pathway, the camera system comprising:

processing circuitry; and an electronic imaging component that uses a first portion of the light reflected from the target subject for electronic image capture, the electronic imaging component reflecting a second portion of the light reflected from the target subject for use by the film media.

9. The camera system of claim 8 further comprising an electronic imager shutter.

10. The camera system of claim 8 further comprising a film shutter.

11. The camera system of claim 8 wherein the electronic imager shutter is used to provide exposure control.

12. The camera system of claim 8 further comprising film writing circuitry that allows various information to be written on the film media.

13. The camera system of claim 8 wherein the electronic imager further comprises an integrated circuit that acts to partially reflect incoming light reflected from the target subject.

14. The camera system of claim 8 wherein the electronic imager further comprises a dielectric reflecting coating that acts to partially reflect incoming light reflected from the target subject.

15. The camera system of claim 8 wherein the electronic imager further comprises an integrated circuit imager that has a metallization layer and a substrate with a relatively narrow thickness, the integrated circuit imager admitting the light reflected from the target subject from a substrate side of the integrated circuit.

16. A method used by a camera system that incorporates an electronic imager to capture light reflected from a target subject, the method comprising:

utilizing a first portion of the light reflected from the target subject to form an electronic image; and reflecting a second portion of the light reflected from the target subject for further imaging purposes.

17. The method of claim 16 further comprising shuttering the electronic imager.

18. The method of claim 16 further comprising shuttering film media.

19. The method of claim 16 further comprising selectively capturing film images, electronic images or both.

20. The method of claim 16 further comprising displaying electronic images captured by the electronic imager.

* * * * *